(12) United States Patent
Samuels et al.

(10) Patent No.: US 7,105,105 B2
(45) Date of Patent: *Sep. 12, 2006

(54) DEICING/ANTI-ICING FLUIDS

(75) Inventors: William D. Samuels, Richland, WA (US); H. Nicholas Conkle, Columbus, OH (US); Bruce F. Monzyk, Delaware, OH (US); Kevin L. Simmons, Kennewick, WA (US); John G. Frye, Jr., Richland, WA (US); Todd A. Werpy, West Richland, WA (US); Sara F. Kuczek, Pataskala, OH (US); Satya P. Chauhan, Columbus, OH (US)

(73) Assignee: Battelle Memorial Institute, Columbus, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/833,942

(22) Filed: Apr. 28, 2004

(65) Prior Publication Data

US 2005/0087720 A1    Apr. 28, 2005

Related U.S. Application Data

(63) Continuation-in-part of application No. 10/374,662, filed on Feb. 26, 2003.

(60) Provisional application No. 60/434,612, filed on Dec. 18, 2002, provisional application No. 60/421,647, filed on Oct. 28, 2002.

(51) Int. Cl.
*C09K 3/18* (2006.01)

(52) U.S. Cl. .......................... 252/70; 106/13
(58) Field of Classification Search ................ 252/70; 106/13

See application file for complete search history.

(56) References Cited

U.S. PATENT DOCUMENTS

| | | | |
|---|---|---|---|
| 3,838,992 A | 10/1974 | Rosenwald | 44/72 |
| 4,210,549 A * | 7/1980 | Hirozawa et al. | 252/76 |
| 4,358,389 A | 11/1982 | Konig-Lumer et al. | 252/70 |
| 4,388,203 A | 6/1983 | Nimerick et al. | 252/70 |
| 4,455,248 A * | 6/1984 | Wood | 252/75 |
| 4,585,571 A | 4/1986 | Bloom | 252/70 |
| 4,746,449 A | 5/1988 | Peel | 252/70 |
| 4,954,279 A | 9/1990 | Ma et al. | 252/70 |
| 5,268,117 A | 12/1993 | Fusiak et al. | 252/70 |
| 5,386,968 A | 2/1995 | Coffey et al. | 252/70 |
| 5,674,428 A | 10/1997 | Lott et al. | 252/70 |
| 5,681,882 A | 10/1997 | Jenkins et al. | 524/388 |
| 5,708,068 A | 1/1998 | Carder et al. | 524/375 |
| 5,750,047 A | 5/1998 | Lemma | 252/70 |
| 5,759,436 A | 6/1998 | Schrimpf et al. | 252/70 |
| 5,772,912 A | 6/1998 | Lockyer et al. | 252/70 |
| 5,817,252 A | 10/1998 | Hu et al. | 252/70 |
| 5,876,621 A | 3/1999 | Sapienza | 252/70 |
| 5,968,407 A | 10/1999 | Boluk et al. | 252/70 |
| 5,980,774 A | 11/1999 | Sapienza | 252/70 |
| 5,993,684 A | 11/1999 | Back et al. | 252/70 |
| 6,080,331 A | 6/2000 | Meszaros et al. | 252/79 |
| 6,129,857 A | 10/2000 | Sapienza | 252/70 |
| 6,149,834 A | 11/2000 | Gall et al. | 252/70 |
| 6,294,104 B1 | 9/2001 | Ilves et al. | 252/70 |
| 6,299,793 B1 | 10/2001 | Hartley et al. | 252/70 |
| 6,315,919 B1 | 11/2001 | Sapienza | 252/70 |
| 6,391,224 B1 | 5/2002 | Wowk | 252/70 |
| 6,436,310 B1 | 8/2002 | Hartley et al. | 252/70 |
| 6,440,325 B1 | 8/2002 | Hartley et al. | 252/70 |
| 6,596,189 B1 | 7/2003 | Moles et al. | 252/70 |
| 2002/0063236 A1 | 5/2002 | Sapienza | 252/70 |

FOREIGN PATENT DOCUMENTS

| | | |
|---|---|---|
| CN | 1138080 | 12/1996 |
| EP | 0257720 B1 | 3/1988 |
| EP | 352120 A2 * | 1/1990 |
| EP | 0555002 A1 | 8/1993 |
| EP | 0646634 B1 | 8/1998 |
| EP | 0860490 A1 | 8/1998 |
| GB | 1272464 | 4/1972 |
| JP | 54-76489 A * | 6/1979 |
| JP | 57167375 A2 | 10/1982 |
| JP | 62201566 A2 | 10/1982 |
| RU | 2142491 | 12/1999 |
| RU | 2186818 | 8/2002 |
| SU | 1101444 | 6/1982 |
| WO | 87/04450 | 7/1987 |
| WO | 91/10361 | 7/1991 |
| WO | 00/00568 A1 | 1/2000 |
| WO | 01/29146 A1 | 4/2001 |

OTHER PUBLICATIONS

Fluka AG: "Fluka Chemika-BioChemika" 1993, p. HFL 1096, Polyvinylpyrrolidone no month.

* cited by examiner

*Primary Examiner*—Anthony J. Green
(74) *Attorney, Agent, or Firm*—MacMillan, Sobanski & Todd, LLC

(57) ABSTRACT

A nontoxic deicing/anti-icing fluid includes a freezing point depressant selected from short chain polyols having 3 to 5 carbons atoms, and mixtures thereof, a wetting agent, an antioxidant/preservative, and water. The fluid has an $LD_{50}$ greater than about 10,000 mg/L. Another deicing/anti-icing fluid includes the freezing point depressant, a vinylpyrrolidone polymer having a molecular weight between about 10,000 and about 700,000, and water. A runway deicing fluid includes glycerol, a buffer, an antioxidant/preservative, and water. Another deicing/anti-icing fluid includes a freezing point depressant having hydrophobic character, a wetting agent comprising an organophosphorus compound capable of producing an organic wettable surface, and water.

20 Claims, No Drawings

DEICING/ANTI-ICING FLUIDS

CROSS-REFERENCE TO RELATED APPLICATION

This application is a continuation-in-part of U.S. application Ser. No. 10/374,662, filed on Feb. 26, 2003. U.S. application Ser. No. 10/374,662 claimed the benefit of U.S. provisional application Ser. No. 60/421,647 filed on Oct. 28, 2002, and U.S. provisional application Ser. No. 60/434,612 filed on Dec. 18, 2002.

BACKGROUND OF THE INVENTION

This invention relates in general to compositions to remove ice, snow and/or frost ("frozen precipitation") from surfaces and/or to prevent ice from forming on surfaces, and in particular to deicing/anti-icing fluids.

De-icing/anti-icing fluids are used on many different surfaces where frozen precipitation is a problem. Deicing involves the application of a deicing fluid onto frozen precipitation that has already formed in order to remove it from a surface. The deicing fluid melts the frozen precipitation by lowering its freezing point. Anti-icing involves the application of an anti-icing fluid onto a surface before ice is present, thereby lowering the freezing point of any precipitation that contacts the surface and preventing it from turning into ice. Some fluids are useful for both de-icing and anti-icing, while others are particularly useful for one or the other.

In a particular application, deicing/anti-icing fluids are used in the airline industry. Aircraft deicing fluids (ADF) are formulated to remove ice, snow and frost from the exterior surfaces of aircraft. They are also formulated to flow easily from the aircraft surfaces during takeoff and to minimize effects on aerodynamic performance at low temperatures. Runway deicing fluids (RDF) are formulated to deice and anti-ice airport runways and taxiways. They penetrate and break the bond between packed snow and ice and the runway/taxiway surface, thus facilitating the removal of the frozen accumulation by mechanical means. They also decrease the potential for ice formation on the runway/taxiway.

Aircraft deicing fluids are usually composed of water, a freezing point depressant, and an additive package. The freezing point depressant is typically ethylene glycol, diethylene glycol, or propylene glycol. The glycol-based fluids are effective deicers, but they are often considered to be harmful to the environment, particularly if applied in large volumes. Consequently, there is a need for environmentally friendly deicing/anti-icing fluids that perform comparably to the glycol-based fluids.

The additive packages of aircraft deicing fluids usually include wetting agents, pH buffers, antioxidants, antiprecipitation agents, dyes, foam suppressors, and in many cases corrosion control and fire inhibitors. The wetting agents of choice of aircraft deicing fluids are nonylphenol ethoxylates such as octylphenol ethoxylates and alcohol ethoxylates. The nonylphenol ethoxylates are low-cost, nonionic wetting agents that reduce surface tension and are characterized by low foaming potential. However, one of their breakdown products, nonylphenol, is a known endocrine disruptor and could present a danger to the receiving water from an airport engaged in aircraft deicing operations. (Corsi, Steven R., et al. "Nonylphenol Ethoxylates and Other Additives in Aircraft Deicers, Antiicers, and Waters Receiving Airport Runoff," Environmental Science and Technology, Vol. 37, No. 18, 2003, pp. 4031–4037.) Therefore, it would be advantageous to provide improved wetting agents for deicing/anti-icing fluids.

Several patents disclose aircraft deicing/anti-icing fluids containing sorbitol and/or glycerol as a freezing point depressant instead of a glycol. For example, U.S. Pat. No. 6,129,857 to Sapienza discloses aircraft deicing/anti-icing fluids containing sorbitol, water and other ingredients. U.S. Pat. No. 5,993,684 to Back et al. discloses aircraft deicing fluids containing glycerol, sorbitol and water, and optionally materials such as thickeners, antioxidants, pH adjusters, stabilizers, biocides, or corrosion inhibitors. International Patent Publication No. WO 01/29146 A1 to Westmark et al. discloses aircraft deicing fluids containing glycerol, nonionic surfactant, polysaccharide thickener, and water. There is still a need for improved deicing/anti-icing fluids.

SUMMARY OF THE INVENTION

This invention relates to a nontoxic deicing/anti-icing fluid including a freezing point depressant selected from the group consisting of short chain polyols having 3 to 5 carbons atoms, and mixtures thereof, a wetting agent, an antioxidant/preservative, and water. The fluid has a lethal dose ($LD_{50}$) greater than about 10,000 mg/L.

The invention also relates to a deicing/anti-icing fluid including a freezing point depressant selected from the group consisting of short chain polyols having 3 to 5 carbons atoms, and mixtures thereof, a vinylpyrrolidone polymer having a molecular weight between about 10,000 and about 700,000, and water.

The invention also relates to a deicing/anti-icing fluid including a freezing point depressant selected from the group consisting of short chain polyols having 3 to 5 carbons atoms, and mixtures thereof, a wetting agent selected from the polyoxyalkylene ethers, an antioxidant/preservative, an antifoamer, and water.

The invention also relates to a deicing/anti-icing fluid including a freezing point depressant selected from the group consisting of short chain polyols having 3 to 5 carbons atoms, and mixtures thereof, a wetting agent, a food grade material that functions as an antioxidant/preservative, and water.

The invention also relates to a deicing/anti-icing fluid including a freezing point depressant selected from the group consisting of short chain polyols having 3 to 5 carbons atoms, and mixtures thereof, a material that functions as both a buffer and a freezing point depressant, and water.

The invention also relates to a concentrated deicing/anti-icing fluid including a freezing point depressant selected from the group consisting of short chain polyols having 3 to 5 carbons atoms, and mixtures thereof, a vinylpyrrolidone polymer having a molecular weight between about 10,000 and about 700,000, and from about 5% to about 20% by weight of water.

The invention also relates to a runway deicing fluid including glycerol, a buffer, an antioxidant/preservative, and water.

The invention further relates to a deicing/anti-icing fluid including a freezing point depressant having hydrophobic character, a wetting agent comprising an organophosphorus compound capable of producing an organic wettable surface, and water.

Various advantages of this invention will become apparent to those skilled in the art from the following detailed description of the preferred embodiments.

DETAILED DESCRIPTION OF THE PREFERRED EMBODIMENTS

In one embodiment, the invention relates to a nontoxic deicing/anti-icing fluid comprising a freezing point depressant selected from the group consisting of short chain polyols having 3 to 5 carbons atoms, and mixtures thereof, a wetting agent, an antioxidant/preservative, and water. The nontoxic deicing/anti-icing fluid sometimes consists essentially of these ingredients. It has been discovered that a fluid having desirable performance properties and physical characteristics can be produced using a freezing point depressant as described above in combination with a streamlined low toxicity additive package. The fluid does not require all the additives typically used in such fluids to achieve the desired performance.

The nontoxic deicing/anti-icing fluid usually passes the deicing requirements for commercial and military use. The fluid usually meet the requirements of one or more of the following specifications: Aerospace Material Specification (AMS) 1424E, "Deicing/Anti-Icing Fluid, Aircraft," published in 2003, or its international equivalent, The International Organization for Standardization, ISO 11075, "Aerospace-Aircraft De-Icing/Anti-Icing Newtonian Fluids ISO Type I", AMS 1435B "Fluid, Generic, Deicing/Anti-Icing Runways and Taxiways", published in August 1999, and Boeing D6-17487 rev. P test revised Apr. 25, 2003, or versions of these specifications that may be updated in the future. Aircraft deicing fluids according to the invention usually qualify as certified SAE Type I fluids (e.g., certified at AMIL-UQAC).

The deicing/anti-icing fluid is exponentially less toxic than traditional propylene glycol and ethylene glycol deicers. The fluid has an $LD_{50}$ for fathead minnows greater than about 10,000 mg/L, preferably greater than about 15,000 mg/L, more preferably greater than about 30,000 mg/L, and most preferably greater than about 50,000 mg/L. The aquatic toxicity is determined using a fathead minnow 96-hour $LD_{50}$ as measured according to OECD Methods 202 and 203 or equivalent. The $LD_{50}$ is the highest concentration at which 50% of the fish do not survive the test period.

The freezing point depressant used in the deicing/anti-icing fluid is selected from the group of short chain polyols having 3 to 5 carbon atoms, or a mixture of such polyols. These include all reduced 3–5 carbon aldose and ketose sugars. Typically, the C3 polyol is glycerol, the C4 polyols are erythritol and threitol, and the C5 polyols are xylitol, ribitol, arabitol, and pentaerythritol. Glycerol is a preferred polyol for use in the fluid.

In some embodiments, the fluid includes a mixture of the polyols. Preferably, the mixture includes glycerol in combination with one or more of the other listed polyols, such as xylitol or pentaerythritol. The glycerol provides the main freezing point lowering effect, while the other polyol provides primarily a thickening effect that enhances the performance of the composition when used as a fluid. Other higher molecular weight polyols, such as sorbitol, can also be used as thickeners, but too much sorbitol may be undesirable in terms of making concentrated products. Some fluids according to the invention exclude sorbitol.

The polyols can be either biobased or synthetic. Biobased polyols are produced from renewable resources such as corn and corn processing byproducts or from other agricultural sources. Synthetic polyols can be produced from petroleum refining and other chemical processes. The polyols are economically and readily available in commercial quantities. It is expected that the polyol-based deicing/anti-icing fluids can be produced more inexpensively than glycol-based deicers.

The amount of polyol used in the fluid is the balance after adding the percentages of wetting agent, antioxidant/preservative, water, and any optional ingredients. The fluid can contain any suitable amount of polyol. Deicing/anti-icing fluids preferably contain from about 10% to about 95% polyol by weight, and more preferably from about 50% to about 88%. When the fluid contains glycerol in combination with one or more of the other polyols, the fluid preferably contains from about 10% to about 88% glycerol and from about 1% to about 30% other polyol(s). Some preferred fluids including glycerol as the only polymer contain from about 70% to about 90% glycerol by weight, and typically from about 80% to about 90%.

The deicing/anti-icing fluid can include one or more wetting agents. When the fluid is intended for use on a metal surface, such as an aircraft exterior surface, the wetting agent is preferably an organophosphorus compound. We have discovered that the preferred wetting agent for such a surface has unusual properties: the ability to produce an organic wettable surface, and not the conventional water wettable surface of the prior art. The most preferred organophosphorus compounds are nontoxic and biodegradable organophosphates and organophosphorus acids of the general molecular structures: $RR'R''P=O$ or $R'''R''''P(=O)O-M+$, and especially the M+ salts of the acids, where M+ can be K+, Na+, H+, or water soluble ammonium compounds, $NH_xR''''^+_y$, where x+y=4, and x or y can range from 0–4. These compounds are known collectively as organophosphates, and specifically as phosphate esters, organophosphoric acid salts, phosphonates, phosphinic acid esters and salts, etc. Note that the salt can be added as a salt or formed in situ by the addition of the parent acid and a suitable base. For these structures, all of the "R" groups (i.e. R, R', R", R'''and R'''') are alkyl, linear or branched, and preferably devoid of any aromatic groups, as members of such groups can form endocrine disruptor compounds and can be slow to biodegrade. Preferred are compounds containing combinations of R, R', R", R''' and R'''' alkyl groups with total carbon numbers per molecule of one to 30 carbon atoms and where each R group can contain from zero to 18 carbon atoms. Straight chain lengths of C10–C18 are least preferred due to their tendency to foam. Such length compounds are best used in dilute amounts, especially below their critical micelle concentration (CMC), combined with other organophosphorus compounds of different structure, and/or combined with branched alkyl groups in the same molecule. Also included are compounds in which the alkyl group is bonded to the P atom either directly (C—P bond), or via an oxygen atom (i.e., C—O—P bonds). These alkyl "R" groups do not need to be the same but often are for simplicity in manufacture. Example compounds are provided below. Blends of such compounds are equally effective and may impart a desirable blend of properties while minimizing costs. Polyphosphates, such as metaphosphate esters, and esters of "phossy glass" are other organophosphorus compounds suitable for use as the wetting agent.

Although we wish not to be bound by theory, the perceived mode of action of the organophosphorus compounds appears to make use of the propensity for these compounds towards P—O-M bond formation, where O-M denotes a metal surface oxide, e.g. P—O—Al (III) or P—O—Zn (II)or P—O—Fe (III). Such bonds are sufficiently weak to only sorb to metal oxide surfaces. The bonds do not etch metal surfaces, such as aircraft, and are not permanent, so that the surfaces can be readily cleaned free of the compounds during normal washing. Importantly, the organophosphorus compounds cling tight enough to the metal surface to displace bonded water, thereby preventing nucleation of adherent ice crystals, and so replace the hydrophilic surface with a hydrophobic one due to the protruding "R" groups bonded to the phosphorus, i.e., Aluminum metal (AlO)-aluminum oxyhydroxide (AlOOH) layer-$H_2O$ film-ICE
↓+$R'''R''''P(=O)O^{-M+}$ in glycerol
Aluminum metal (AlO)-aluminum oxyhydroxide (AlOOP(=O)R'''R'''')-glycerol where AlO depicts the mainly aluminum alloy aircraft surface (normally aluminum-copper alloys), and AlOOH depicts the oxidized aluminum film present on all aluminum surfaces. The bar, i.e., "-" illustrates two adjacent bonded layers. Similar equations could be written for other metals such as copper, iron and zinc. The above equation illustrates how an ice forming water film is displaced by the organophosphorus compound, rendering the surface hydrophobic and therefore preferentially wettable by the glycerol, or other water-soluble freezing point depressant alcohol such as ethylene glycol, propylene glycol, or sorbitol. These compounds are known to exhibit some hydrophobic character. Accordingly, the use of the organophosphorus compound as a wetting agent is applicable to any deicing/anti-icing fluid containing a freezing point depressant, such as an alcohol, having at least some hydrophobic character.

Suitable examples of organophosphorus compounds suitable for use as the wetting agent are described below. Such compounds can be used as the only wetting agent in the formulation, or they can be combined in mixtures with other organophosphorus compounds or other types of wetting agents.

(1) Phosphonic acids and their salts, such as 2-ethylhexyl 2-ethylhexyl phosphonic acid (Daihachi Chemical product PC-88A), also referred to as di-ethylhexyl phosphonic acid or DEHPA for short, i.e.,

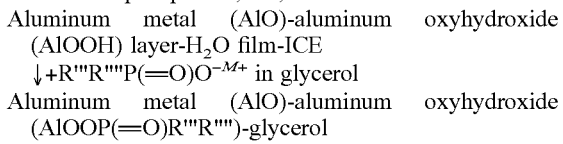

where n-Bu indicates the normal (straight chain) butyl alkyl group, and Et indicates an ethyl group. M was defined previously.

(2) Di(n-butyl) n-butyphosphonate ester (Daihachi Chemical product PC-44), $C_4H_9P(O)(OC_4H_9)_2$, and its first and second hydrolysis products alkyl phosphonate esters.

(3) Tri(n-butyl) phosphate (TBP):$(n-C_4H_9O)_3P=O$.

(4) Di(isodecyl)phosphonic acid (Daihachi Chemical product DP-10R)
$(b-C_{10}H_{21}O)_2P(O)O^-M^+$
Where "b" indicates branching alkyl structure.

(5) Bis(2,4,4-trimethylpentyl) phosphinic acid (Cytec Company product Cyanex® 272): $(CH_3C(CH_3)_2 CH_2 CH CH_3 CH_2)_2 P(=O)O^-M^+$ (6) Tri(n-butyl) phosphine oxide (Cyanex 923):$(n-C_4H_9)_3 P=O$.

(7) A mixture of 4 trialkyl phosphine oxides, i.e.
$R_3P(O)$
$R_2R'P(O)$
$RR'_2P(O)$
$R'_3P(O)$ where $R=[CH_3(CH_2)_7]$ normal octyl and $R'=[CH_3(CH_2)_5]$ normal hexyl.

(10) Trioctylphosphine oxide (TOPO, Cyanex 921): $R_3P(O)$, where $R=[CH_3(CH_2)_7]$.

(11) Di and mono alkyl phosphates of phosphoric acid and their salts. Most preferred of this group is di(2-ethylhexyl) phosphoric acid and its salts, i.e.
$[n-BuC(Et)HCH_2O]_2P(=O)O^-M^+$ where n-Bu indicates the normal (straight chain) butyl alkyl group, and Et indicates an ethyl group. M was defined previously.

The organophosphorus compounds have unexpected wetting agent properties without the side effect of foaming of most wetting agents. The organophosphorus compounds are either nonfoaming or low foaming (where bubbles collapse rapidly). Organophosphorus compounds such as DEHPA have not previously been known for use as wetting agents; DEHPA is typically used as a solvent in products such as hydraulic fluids and metal extractants.

Other wetting agents suitable for use in the deicing/anti-icing fluid include practically any of the nonionic, anionic, cationic, and amphoteric (zwitterionic) wetting agents known in the art. The nonionic wetting agents are preferred. Some nonlimiting examples of suitable nonionic wetting agents are: fatty or oxo-alcohol polyethyleneglycol ethers ($C_{16}$ or lower, $C_6$ or lower preferred); ethylene oxide-propylene oxide polymers ($C_{80}$ or lower, $C_2$ or lower preferred); fatty alcohol polyglycol ethers ($C_{18}$ or lower, $C_8$ or lower preferred); polyethoxylates such as polyoxyethylene ethers; polypropyloxylates such as polyoxypropylene ethers; sugar-based wetting agents such as alkyl glycosides (e.g., alkyl benzene and tert-butoxyethanol); ethers of $C_1$ to $C_8$ polyethylene oxide repeat units of 2 to 50 polyethylene oxide units (low carbon alkyl group and somewhat higher carbon ethoxylate group preferred); polyvinyl alcohols having MW 1000–10,000; and polyvinyl pyrrolidones. Preferably, the deicing/anti-icing fluid does not contain any alkylphenol ethoxylates ($C_{12}$ or lower), such as the nonylphenol ethoxylates that are endocrine disruptors.

In a particular embodiment, the deicing/anti-icing fluid includes a freezing point depressant as described above, an antioxidant/preservative, and one or more nonionic wetting agents selected from the polyoxyalkylene ethers. Some suitable polyoxyalkylene ethers are ethers of $C_{12}$ to $C_{18}$ alcohols with polyethylene oxide repeat units of 2 to 100 polyethylene oxide units. Such wetting agents include, for example, the Brij™ series of wetting agents manufactured by ICI (e.g., Brij 30, 35, 52, 56, 58, 72, 76, 78, 92, 97, 98 and 700). Brij 35 is polyoxyethylene lauryl ether, 718 average MW, having the chemical formula: $CH_3(CH_2)_{11}(CH_2CH_2O)_xH$, where x on average is 23. When the polyoxyalkylene ethers are used, it may be desirable to include an antifoamer in the fluid to reduce the level of and retention time of foam generated during spray application. In some applications in which any foaming is undesirable for aesthetic or other reasons, it is usually preferable to exclude the use of the polyoxyalkylene ethers.

The fluid can contain any suitable amount of wetting agent. Preferably, the fluid contains from about 0.01% to about 0.5% wetting agent by weight, and more preferably from about 0.05% to about 0.2%.

The fluid may contain one or more antiprecipitating agents if production or dilution of the fluid is carried out with hard water. The use of distilled/deionized water eliminates the need for an antiprecipitating agent. Some examples of suitable antiprecipitating agents include sodium tripolyphosphate, EDTA (ethylenediamine tetraacetic acid), and other organic polyacetates capable of chelating plus two metal cations ($M^{2+}$) found in hard water.

The deicing/anti-icing fluid can also include one or more materials that function as antioxidants and/or preservatives. Some nonlimiting examples of suitable antioxidants are salts of unsaturated carboxylic acids having 4 to 18 carbon atoms. In a preferred embodiment, the fluid includes a freezing point depressant as described above, a wetting agent, and a food grade material that functions as an antioxidant and/or a preservative. It was not obvious beforehand to use a food grade material in a nonfood application (the deicing/anti-icing fluids). It was also necessary to determine which food grade materials would go into solution and provide the desired antioxidant and/or preservative benefits.

Any suitable food grade material having the desired solubility and antioxidant and/or preservative properties can be used, such as sodium sorbate, potassium sorbate, or an unsaturated triglyceride such as corn oil, cottonseed oil, linseed oil, or tung oil. Tocopherols can also be used; these are natural products that are present in soybean oil and other natural product oils. Potassium sorbate and sodium sorbate provide very effective anti-oxidation protection. If desired, the sodium sorbate can be provided by adding an equal molar mixture of sorbic acid and sodium bicarbonate that reacts to form sodium sorbate. Benzoid acid and its salts (e.g., alkali metal salts) are useful as preservatives in the deicing/anti-icing fluids. Some food grade materials such as ascorbic acid, citric acid, and BHT were found to be insufficient in their antioxidant effect and/or solubility.

The fluid can contain any suitable amount of the material that functions as an antioxidant and/or preservative. Preferably, the fluid contains from about 0.01% to about 1% by weight of the material, and more preferably from about 0.05% to about 0.2%.

The deicing/anti-icing fluid can optionally include one or more buffers for pH control. The fluid can have any suitable pH, usually from about 3.5 to about 9, and typically from about 6 to about 9. Some nonlimiting examples of suitable buffers include: phosphate salts, pyrophosphates, metaphosphates, carbonic acid and its salts, adipic acid and its salts, maleic acid and its salts, and ascorbic acid and its salts, where the salts are typically $Na^+$, $K^+$, or $NH_4^+$.

In one embodiment, the fluid includes a freezing point depressant as described above, a material that functions as both a buffer and a freezing point depressant, and water. Preferably, the material also improves the thermal stability of the fluid. Any suitable material having these properties can be used, for example, certain of the phosphate salts. A particular example is a mixture of mono-basic sodium phosphate and di-basic sodium phosphate, such as the monohydrate mono-basic and heptahydrate di-basic sodium phosphates.

The fluid can contain any suitable amount of the buffer or buffer/freezing point depressant. The fluid preferably contains from about 0.02% to about 2% mono-basic sodium phosphate and/or potassium phosphate and from about 0.02% to about 2% di-basic sodium phosphate and/or potassium phosphate by weight, more preferably from about 0.3% to about 1.5% mono-basic sodium/potassium phosphate and from about 0.3% to about 1.5% di-basic sodium/potassium phosphate.

The deicing/anti-icing fluid can optionally include one or more anti-microbial agents. Some nonlimiting examples of suitable anti-microbial agents include: sodium azide; quaternary ammonium compounds (e.g., 2-methyl-4,5-trimethylene-4-isothizoline-3-one; n-alkyl dimethyl benzyl ammonium $X^-$[where alkyl carbon number is $C_{12-18}$]; n-alkyl trimethyl ammonium $X^-$[where alkyl carbon number is $C_{12-18}$]; dialkyl dimethyl ammonium $X^-$[where alkyl carbon number is $C_{12-18}$]; octyl decyl dimethyl ammonium $X^-$[where $X^-$ is $Cl^-$, $Br^-$, $I_3^-$, $HCO_3^-$, $CO_3^{2-}$, phosphates phosphonates, OH, carboxylates, polycarboxylates]); $M^+$ benzoates (where $M^+$ is $Na^+$, $K^+$, $NH_4^+$; alkyl dimethyl benzyl ammonium chlorides; and alkyl dimethyl benzyl/ ethyl benzyl ammonium chlorides.

In another embodiment of the invention, the deicing/anti-icing fluid includes a freezing point depressant as described above, in combination with a vinylpyrrolidone polymer having a molecular weight between about 10,000 and about 700,000, and water. By "vinylpyrrolidone polymer" is meant a homopolymer or a copolymer of vinylpyrrolidone, or a derivative thereof. Suitable derivatives of vinylpyrrolidine polymer may include alkylated polyvinylpyrrolidones, 2-menthyl. Preferably, the vinylpyrrolidone polymer is polyvinylpyrrolidone.

The vinylpyrrolidone polymer has a molecular weight between about 10,000 and about 700,000, and preferably not greater than about 360,000. It is believed that higher molecular weight vinylpyrrolidone polymers may produce deicing/anti-icing fluids having less desirable properties, particularly for aircraft and runway deicing.

The deicing/anti-icing fluid can contain any suitable amount of the vinylpyrrolidone polymer. Typically, the fluid contains about 5% or less vinylpyrrolidone polymer, and usually between about 0.01% and about 3%.

Advantageously, the vinylpyrrolidone polymer often functions as both a thickener and a wetting agent in the fluid. Consequently, a fluid having desirable properties can be produced using a minimal number of ingredients. However, optionally the fluid can also contain other ingredients such as an antioxidant/preservative and/or a second wetting agent.

The deicing/anti-icing fluid also includes water in any suitable amount for formulating the desired fluid. By "water" is meant any suitable type of aqueous solvent. The fluid can be formulated as a ready-to-use (RTU) fluid that does not require dilution before use, or it can be formulated as a concentrated fluid that will be diluted by the user by the addition of water. Ready-to-use fluids usually include water in an amount of from about 15% to about 70% by weight, and typically from about 15% to about 50%. It should be noted that the percentages of other materials given above are based on a ready-to-use fluid. Concentrated fluids usually include water in an amount of from about 5% to about 40% by weight, and typically from about 10% to about 30%. The percentages of other materials in the fluid increase as the percentage of water decreases.

In another embodiment, the invention relates to a concentrated deicing/anti-icing fluid including a freezing point depressant as described above, water, and a vinylpyrrolidone polymer having a molecular weight between about 10,000 and about 700,000. The use of the vinylpyrrolidone polymer in the fluid enables an effective, highly concentrated fluid. The vinylpyrrolidone polymer can solubilized with very little water, and thus it can be used in place of ingredients that require a larger amount of water to solubilize, such as sorbitol or xylitol. The concentrated fluid usually contains from about 5% to about 20% water, and typically from about 10% to about 20%. In some preferred embodiments, the concentrated fluid contains from about 80% to about 88% glycerol, from about 0.5% to about 3% vinylpyrrolidone polymer, and from about 10% to about 20% water. Optionally, the concentrated fluid may contain additional ingredients such as an antioxidant/preservative and/or a wetting agent.

The deicing/anti-icing fluid can be used in any application requiring deicing and/or anti-icing. In some embodiments, the fluid is used for the removal of, and/or time-limited protection against, deposits of frost, ice and/or snow on exterior aircraft surfaces prior to take off, or on roadway/runway surfaces. The fluid is usually applied through a commercial deicing/anti-icing vehicle system to the surface at a pressure and flow rate normal for intended use.

In addition to application to aircraft, the fluid can also be used for other anti-icing/deicing applications. Common applications would include surfaces of, for example, airport pavements, roadways, walkways, sidewalks, bridges, entrances, electrical tower structures and their components, electricity transmission lines, canals, locks, vessels, nautical components, railroad switches, and motor vehicles. In addition, the fluid can be used in applications such as birdbaths, outdoor fountains, decorative ponds, and other outdoor areas where water freezing would be aesthetically or functionally unacceptable. In these applications the fluid can prevent water from freezing during the winter in cold climates with reduced biological risk to wildlife or domestic animals. The deicing/anti-icing fluid may also be useful in some indoor applications to remove ice or prevent its formation.

Following are some examples of deicing/anti-icing fluids according to the invention. The exemplified fluids are particularly suitable for use as aircraft deicing fluids, but they could also be used for other deicing/anti-icing applications.

Concentrated Aircraft Deicing Fluids:

First Concentrated ADF

| % Range | % Preferred | Chemical |
|---|---|---|
| 70–90% | 82% | Glycerol, 99% |
| 0.01–1.0% | 0.05% | DEHPA |
| 0.01–1.0% | 0.077% | Benzoic Acid |
| 0.02–2.0% | 0.90% | $KH_2PO_4$ monobasic |
| 0.02–2.0% | 0.60% | $K_2HPO_4.7H_2O$ dibasic |
| 10–20% | 15.5% | Water |
| 0.05–0.1% | trace | Food coloring |
| 0.01–3.0% | 0.96 | Polyvinylpyrrolidone, molecular weight 360,000 Daltons |

Second Concentrated ADF

| % Range | % Preferred | Chemical |
|---|---|---|
| 70–90% | 82% | Glycerol, 99% |
| 0.01–1.0% | 0.096% | Brij ® 35 |
| 0.01–1.0% | 0.077% | Sorbic acid |
| 0.01–1.0% | 0.058% | $KHCO_3$ |
| 0.02–2.0% | 0.90% | $KH_2PO_4.H_2O$ |
| 0.02–2.0% | 0.60% | $K_2HPO_4.7H_2O$ |
| 0.01–1.0% | 0.05% | Antifoamer |
| 10–20% | 15.3% | Water |
| 0.05–0.1% | trace | Food coloring |
| 0.01–3.0% | 0.96 | Polyvinylpyrrolidone, molecular weight 360,000 Daltons |

Ready to Use Aircraft Deicing Fluids:

First RTU ADF

| % Range | % Preferred | Chemical |
|---|---|---|
| 10–80% | 73.3% | Glycerol, 99% |
| 0.01–1.0% | 0.096% | Brij ® 35 |
| 0.01–1.0% | 0.077% | Sorbic acid |
| 0.01–1.0% | 0.058% | $NaHCO_3$ |
| 0.02–2.0% | 0.48% | $NaH_2PO_4.H_2O$ monobasic |
| 0.02–2.0% | 0.98% | $Na_2HPO_4.7H_2O$ dibasic |
| 0.01–1.0% | 0.05% | Non silicate antifoamer |
| 15–70% | 24% | Water |
| 0.05–0.1% | trace | Food coloring |
| 0.01–3.0% | 0.96 | Polyvinylpyrrolidone, molecular weight 360,000 Daltons |

Second RTU ADF

| % Range | % Preferred | Chemical |
|---|---|---|
| 10–70% | 60.35% | Glycerol, 99% |
| 1–25% | 6.04% | Xylitol |
| 0.01–1.0% | 0.095% | Brij ® 35 |
| 0.01–1.0% | 0.076% | Sorbic acid |
| 0.01–1.0% | 0.057% | $NaHCO_3$ |
| 0.02–2.0% | 1.17% | $NaH_2PO_4.H_2O$ monobasic |
| 0.02–2.0% | 1.18% | $Na_2HPO_4.7H_2O$ dibasic |
| 15–70% | 31% | Water |
| 0.05–0.1% | trace | Food coloring |

Third RTU ADF

| % Range | % Preferred | Chemical |
|---|---|---|
| 10–80% | 50% | Glycerol, 99% |
| 2–9% | 9% | Sorbitol, 70% |
| 0.01–1.0% | 0.05% | Brij ® 35 |
| 0.01–1.0% | 0.04% | Sorbic acid |
| 0.01–1.0% | 0.03% | $NaHCO_3$ |
| 0.02–2.0% | 0.02% | $NaH_2PO_4.H_2O$ monobasic monohydrate |
| 0.02–2.0% | 0.02% | $Na_2HPO_4.7H_2O$ dibasic heptahydrate |
| 0.01–1.0% | 1% | Non-silicate antifoamer |
| 15–70% | 40% | Water |
| 0.05–0.1% | trace | Food coloring |

The above fluids are very non-toxic. In particular, the third fluid has an $LD_{50}$ (fathead minnow) of 58,000 mg/L. The deicing/anti-icing fluid of the invention is believed to be substantially less toxic than previously known deicers.

The following table lists some different formulations of aircraft deicing fluids according to the invention (the amounts shown are weight percentages). The last four fluids are concentrated while the others are ready-to-use.

| | | | | | | | | | |
|---|---|---|---|---|---|---|---|---|---|
| glycerol | 66.82 | 62.6 | 59 | 66.73 | 62.63 | 57.85 | 66.66 | 62.37 | 58.87 |
| xylitol | 6.68 | 12.5 | 17.7 | 6.68 | 12.50 | 17.30 | 6.67 | 12.50 | 17.57 |
| water | 22.5 | 21.2 | 19.8 | 25.18 | 23.54 | 23.63 | 24.07 | 22.52 | 20.90 |
| Brij-35 | 0.13 | 0.12 | 0.11 | 0.13 | 0.12 | 0.11 | 0.10 | 0.10 | 0.10 |
| sodium sorbate | 1.29 | 1.21 | 1.13 | 1.29 | 1.21 | 1.11 | 1.01 | 1.00 | 1.00 |
| $NaH_2PO_4$ | 1.29 | 1.22 | 1.14 | 0 | 0 | 0 | 1.00 | 1.00 | 1.03 |
| $Na_2HPO_4$ | 1.3 | 1.22 | 1.14 | 0 | 0 | 0 | 0.50 | 0.50 | 0.53 |
| polyvinyl-pyrrolidone | 0.05 | 0.05 | 0.05 | 0.05 | 0.05 | 0.05 | 0.05 | 0.05 | 0.05 |
| glycerol | 66.66 | 66.6 | 62.44 | 76.35 | | 80.0 | 88.0 | 84.05 | 88.05 |
| xylitol | 6.67 | 6.67 | 12.48 | 0 | | 0 | 0 | 0 | 0 |
| water | 23.16 | 24 | 22.48 | 20.03 | | 16.1 | 8.52 | 12.70 | 7.24 |
| Brij-35 | 0 | 0.10 | 0.10 | 0.10 | | 0.18 | 0.19 | 0.18 | 0.19 |
| sodium sorbate | 1.02 | 1.08 | 1.00 | 1.00 | | | | | |
| $NaH_2PO_4$ | 0.50 | 0.50 | 0.50 | 0.50 | | 0.99 | 1.09 | 1.04 | 1.09 |
| $Na_2HPO_4$ | 1.00 | 1.00 | 1.00 | 1.02 | | 0.65 | 0.72 | 0.69 | 0.72 |
| polyvinyl-pyrrolidone | 1.00 | 1.00 | 1.00 | 1.00 | | 1.19 | 1.30 | 1.24 | 2.61 |
| sorbic acid | | | | | | 0.88 | 0.10 | 0.09 | 0.10 |

The above-listed formulations can also contain a colorant in any suitable amount, usually equivalent to about 0.01 percent.

The following table lists some different ready-to-use aircraft deicing fluid formulations according to the invention (the amounts shown are weight percentages).

| | | | | | | | | | |
|---|---|---|---|---|---|---|---|---|---|
| glycerol | 66.71 | 65.97 | 67.49 | 66.71 | 65.97 | 67.49 | 51.00 | 51.0 | 51.00 |
| sorbitol | 6.66 | 9.00 | 9.00 | 6.66 | 9.00 | 9.00 | 9.00 | 9.00 | 9.00 |
| water | 22.61 | 21.26 | 19.97 | 22.61 | 21.26 | 19.97 | 36.90 | 36.95 | 37.05 |
| Brij-35 | 0.13 | 0.12 | 0.11 | 0.13 | 0.12 | 0.11 | 0.10 | 0.05 | 0.05 |
| $NaH_2PO_4$ | 1.30 | 1.22 | 1.14 | 0.00 | 0.00 | 0.00 | 1.00 | 1.00 | 0.50 |
| $Na_2HPO_4$ | 1.29 | 1.22 | 1.14 | 0.00 | 0.00 | 0.00 | 1.00 | 1.00 | 0.50 |
| sodium sorbate | 1.29 | 1.22 | 1.14 | 1.29 | 1.22 | 1.14 | 1.00 | 1.00 | 1.00 |
| glycerol | 55.49 | 55.49 | | | | | | | |
| mannitol | 5.54 | 5.54 | | | | | | | |
| water | 35.64 | 37.79 | | | | | | | |
| Brij-35 | 0.11 | 0.11 | | | | | | | |
| $NaH_2PO_4$ | 1.08 | 0.00 | | | | | | | |
| $Na_2HPO_4$ | 1.07 | 0.00 | | | | | | | |
| sodium sorbate | 1.07 | 1.07 | | | | | | | |
| glycerol | 66.66 | 62.48 | 58.88 | 65.39 | 62.19 | 58.82 | 65.39 | 62.19 | 58.82 |
| xylitol | 6.67 | 12.52 | 17.63 | 6.54 | 13.08 | 19.62 | 6.54 | 13.08 | 19.62 |
| water | 22.51 | 21.09 | 19.82 | 22.70 | 22.70 | 22.70 | 26.66 | 23.32 | 20.15 |
| Brij-35 | 0.13 | 0.12 | 0.12 | 0.13 | 0.13 | 0.13 | 0.13 | 0.13 | 0.13 |
| $NaH_2PO_4$ | 1.36 | 1.28 | 1.20 | 1.29 | 1.29 | 1.29 | 0.00 | 0.00 | 0.00 |
| $Na_2HPO_4$ | 1.34 | 1.26 | 1.18 | 4.62 | 1.29 | 1.29 | 0.00 | 0.00 | 0.00 |
| sodium sorbate | 1.33 | 1.24 | 1.17 | 1.28 | 1.28 | 1.28 | 1.28 | 1.28 | 1.28 |
| glycerol | 66.79 | 62.49 | 58.86 | 66.79 | 62.49 | 58.86 | | | |
| arabitol | 6.66 | 12.68 | 17.65 | 6.66 | 12.68 | 17.65 | | | |
| water | 22.55 | 21.10 | 19.95 | 25.13 | 23.51 | 22.24 | | | |
| Brij-35 | 0.13 | 0.12 | 0.11 | 0.13 | 0.12 | 0.11 | | | |
| $NaH_2PO_4$ | 1.29 | 1.21 | 1.14 | 0.00 | 0.00 | 0.00 | | | |
| $Na_2HPO_4$ | 1.29 | 1.21 | 1.14 | 0.00 | 0.00 | 0.00 | | | |
| sodium sorbate | 1.29 | 1.21 | 1.14 | 1.29 | 1.21 | 1.14 | | | |
| glycerol | 66.03 | 61.98 | 58.34 | | | | | | |
| erythritol | 6.64 | 12.38 | 17.52 | | | | | | |
| water | 23.22 | 21.78 | 20.51 | | | | | | |
| Brij-35 | 0.13 | 0.12 | 0.12 | | | | | | |
| $NaH_2PO_4$ | 1.33 | 1.25 | 1.18 | | | | | | |
| $Na_2HPO_4$ | 1.33 | 1.25 | 1.17 | | | | | | |
| sodium sorbate | 1.33 | 1.24 | 1.17 | | | | | | |

In one embodiment of the invention, the deicing/anti-icing fluid is particularly suitable for use as a runway deicing fluid (RDF), for the deicing and anti-icing of airport runways and taxiways. However, it can also be used for other deicing/anti-icing applications, such as for deicing roads and bridges. A suitable RDF will usually meet both performance and materials compatibility criteria as delineated in AMS 1435A and Boeing D6-17487 rev. P test, or versions of these specifications that may be updated in the future. The RDF usually meets the freezing point specification defined in AMS 1435A "Fluid, Generic, Deicing/Anti-Icing Runways and Taxiways", published in August 1999, and the cadmium corrosion test defined in Boeing D6-17487 rev. P test revised Apr. 25, 2003, or versions of these specifications that may be updated in the future.

The RDF comprises glycerol, one or more buffers, one or more antioxidants and/or preservatives, and water. The RDF can optionally include a deicing salt and/or another polyol freezing point depressant to replace a portion of the glycerol. The polyol can be a 3–5 carbon polyol as described above, or it can be a different type of polyol, such as a glycol. The RDF can also optionally include a thickener and a wetting agent. Advantageously, the RDF is formulated to be very nontoxic and noncorrosive while still meeting the above-mentioned specifications.

The ingredients can be used in any amounts suitable for achieving the desired specifications. The RDF usually contains from about 20% to about 90% glycerol by weight.

The RDF usually contains not more than about 35% of the deicing salt and/or other polyol freezing point depressant. In some embodiments, it contains from about 15% to about 35% of a deicing salt. Any suitable deicing salt can be used, including potassium acetate, sodium formate, sodium acetate, urea, or mixtures thereof.

The buffer(s) for use in the RDF are chosen to achieve the desired pH while still meeting the desired specifications; not just any buffer will work. Preferably, the buffer is selected from the group of phosphates, carboxylates, carbonates, etc.

The antioxidant(s) and/or preservative(s) for use in the RDF are chosen to achieve the desired properties while still meeting the desired specifications; not just any material will work. Preferably, the antioxidant and/or preservative is selected from the group of previously discussed AFD antioxidants.

If needed, any suitable thickener can be used in the fluid; in some embodiments, the thickener is selected from xylitol, polyvinylpyrrolidone, high fructose syrup or mixtures thereof. The fluid typically contains from about 0.05% to about 15% thickener by weight, if any thickener is added.

The optional wetting agent can be any of those described above, such as DEHPA or Brij-35, typically in an amount of from about 0.05% to about 15% thickener by weight.

A ready-to-use RDF usually includes from about 15% to about 70% water by weight, and a concentrated RDF usually includes from about 5% to about 40% water.

Following are some examples of runway deicing fluids according to the invention:

| | Runway Deicing Fluid | |
|---|---|---|
| % Range | % Preferred | Chemical |
| 80–85% | 82.0% | Glycerol, 99% |
| 0.02–2.0% | 0.85% | K$_2$HPO$_4$ |
| 0.02–2.0% | 0.55% | K$_3$PO$_4$ |
| 0.01–1.0% | 0.05% | Benzoic Acid |
| 10–15% | 24% | Water |

| | | | | | | |
|---|---|---|---|---|---|---|
| glycerol | 33.31 | 27.51 | 35.0 | 49.65 | 50.00 | 78.00 |
| xylitol | 13.32 | 11.00 | 0 | 5.03 | 0 | 4.16 |
| water | 29.6 | 34.86 | 34 | 24.00 | 22.82 | 16.65 |
| Brij 35 | 0.13 | 0.11 | 0 | 0.10 | 0.09 | 0.08 |
| potassium sorbate | | | | 0.10 | 0.09 | 0.08 |
| sodium carbonate | | | | 1.27 | 1.10 | 1.03 |
| potassium acetate | 22.22 | 25.12 | 30.00 | 20.0 | 25.00 | |
| Potassium/dipotassium phosphate | 1.4 | 1.4 | 0.06 | 1.2 | 1.0 | 1.1 |

In accordance with the provisions of the patent statutes, the principle and mode of operation of this invention have been described in its preferred embodiments. However, it must be understood that this invention may be practiced otherwise than as specifically described without departing from its spirit or scope.

What is claimed is:

1. A nontoxic deicing/anti-icing fluid comprising:
    at least about 10% by weight of a freezing point depressant selected from the group consisting of short chain polyols having 3 to 5 carbon atoms, and mixtures thereof;
    a wetting agent;
    a material that functions as at least one of an antioxidant and a preservative; and
    at least about 5% by weight of water;
    the nontoxic fluid having an LD$_{50}$ greater than about 10,000 mg/L.

2. A fluid according to claim 1 wherein the freezing point depressant is a mixture of glycerol and sorbitol or xylitol, the glycerol providing a majority of a freezing point lowering effect, and the sorbitol or xylitol providing a thickening effect.

3. A fluid according to claim 1 further comprising a buffer.

4. A fluid according to claim 1 wherein the fluid meets the requirements of AMS 1424E for an aircraft deicing/anti-icing fluid or AMS 1435A for a runway deicing/anti-icing fluid.

5. A deicing/anti-icing fluid comprising:
    a freezing point depressant selected from the group consisting of short chain polyols having 3 to 5 carbon atoms, and mixtures thereof;
    a vinylpyrrolidone polymer having a molecular weight between about 10,000 and about 700,000; and
    water;
    the fluid meeting the requirements of Aerospace Material Specification 1424E for a Type I aircraft deicing/anti-icing fluid.

6. A fluid according to claim 5 wherein the vinylpyrrolidone polymer functions as both a thickener and a wetting agent in the fluid.

7. A fluid according to claim 5 further comprising a wetting agent.

8. A fluid according to claim 5 further comprising a material that functions as at least one of an antioxidant and a preservative.

9. A deicing/anti-icing fluid comprising:
    at least about 10% by weight of a freezing point depressant selected from the group consisting of short chain polyols having 3 to 5 carbon atoms, and mixtures thereof;
    a wetting agent selected from the polyoxyalkylene ethers;
    a material that functions as at least one of an antioxidant and a preservative excluding citric acid; and
    at least about 5% by weight of water.

10. A deicing/anti-icing fluid comprising:
    at least about 10% by weight of a freezing point depressant selected from the group consisting of short chain polyols having 3 to 5 carbons atoms, and mixtures thereof;
    a wetting agent;
    a food grade material that functions as at least one of an antioxidant and a preservative, excluding citric acid; and
    at least about 5% by weight of water.

11. A concentrated deicing/anti-icing fluid comprising:
    a freezing point depressant selected from the group consisting of short chain polyols having 3 to 5 carbon atoms, and mixtures thereof;

a vinylpyrrolidone polymer having a molecular weight between about 10,000 and about 700,000; and from about 5% to about 20% by weight of water;

the fluid meeting the requirements of Aerospace Material Specification 1424E for a Type I aircraft deicing/anti-icing fluid.

12. A runway deicing fluid comprising:

at least about 10% by weight of glycerol;

a buffer;

a material that functions as at least one of an antioxidant and a preservative; and water;

the fluid meeting the requirements of AMS 1435A for a runway deicing/anti-icing fluid.

13. A runway deicing fluid according to claim 12 comprising from about 70% to about 90% by weight glycerol.

14. A runway deicing fluid according to claim 12 wherein the buffer is selected from the group consisting of phosphate, carboxylates and carbonates.

15. A runway deicing fluid according to claim 12 additionally comprising an organophosphorus compound that functions as a wetting agent.

16. A deicing/anti-icing fluid comprising:

a freezing point depressant having hydrophobic character, the freezing point depressant being selected from the group consisting of short chain polyols having 3 to 5 carbon atoms, and mixtures thereof;

a wetting agent comprising an organophosphorus compound capable of producing an organic wettable surface; and water.

17. A fluid according to claim 16 wherein the organophosphorus compound has a structure $RR'R''P=O$ or $R'''R''''P(=O)O^-M^+$, where R, R', R", R''' and R'''' are linear or branched alkyl groups or aromatic groups, and where $M^+$ can be $K^+$, $Na^+$, $H^+$, or water soluble ammonium compounds, $NH_xR''''_y{}^+$, where x+y=4, and x or y can range from 0–4.

18. A fluid according to claim 16 which is a nontoxic fluid having an $LD_{50}$ greater than about 10,000 mg/L.

19. A fluid according to claim 17 wherein the organophosphorus compound is selected from the group consisting of phosphonic acids and their salts.

20. A fluid according to claim 17 wherein R, R', R", R''' and R'''' exclude aromatic groups.

* * * * *